United States Patent
Matsui et al.

[11] Patent Number: 6,150,012
[45] Date of Patent: Nov. 21, 2000

[54] WHITE FILM TO BE LAMINATED TO METAL SURFACE AND METHOD OF PRODUCING SAME

[75] Inventors: Norikazu Matsui; Tetsuo Matsumoto; Tomohiro Hamada, all of Uji, Japan

[73] Assignee: Unitika Ltd., Hyogo-ken, Japan

[21] Appl. No.: 08/954,212

[22] Filed: Oct. 20, 1997

[30] Foreign Application Priority Data

Oct. 23, 1996 [JP] Japan ................................ 8-281021

[51] Int. Cl.[7] .............................. B32B 5/16; B32B 27/06; B32B 27/36; B32B 31/30
[52] U.S. Cl. .................... 428/216; 428/220; 428/328; 428/480; 428/910; 156/229
[58] Field of Search .................... 428/480, 215, 428/216, 910, 328; 156/229; 429/220

[56] References Cited

U.S. PATENT DOCUMENTS

| | | | |
|---|---|---|---|
| 4,606,976 | 8/1986 | Hensel et al. | 428/480 |
| 5,240,779 | 8/1993 | Ono et al. | 428/458 |
| 5,272,011 | 12/1993 | Tanaka et al. | 428/418 |
| 5,424,121 | 6/1995 | Murakami et al. | 428/337 |

FOREIGN PATENT DOCUMENTS

| | | |
|---|---|---|
| 0677383A2 | 10/1995 | European Pat. Off. . |
| 0717066A1 | 6/1996 | European Pat. Off. . |
| 2181104 | 4/1987 | United Kingdom . |
| 2285952 | 8/1995 | United Kingdom . |

*Primary Examiner*—Paul Thibodeau
*Assistant Examiner*—Ramsey Zacharia
*Attorney, Agent, or Firm*—Fildes & Outland, P.C.

[57] ABSTRACT

A white film to be laminated to a metal surface and a method of producing the same. This white film comprises first and second layers which are laminated with the arrangement of second layer/first layer/second layer. The middle, first layer is composed of 80–40 wt % a first polyester, and 20–60 wt % titanium oxide added therewith. The front and back, second layers are composed of 80–100 wt % a second polyester, and 20–0 wt % titanium oxide. The film is a biaxially stretched film, and the content of titanium oxide in the entire film is 20–50 wt %.

11 Claims, No Drawings

WHITE FILM TO BE LAMINATED TO METAL SURFACE AND METHOD OF PRODUCING SAME

FIELD OF THE INVENTION

The present invention relates to a white film to be laminated to a metal surface and a method of producing the same, and particularly it relates to a white film to be laminated to a metal surface and a method of producing the same, which white film has superior heat laminatability, formability and tensile strength and which is superior in whiteness and hidability and also in printability, these properties producing said white film optimum for use as an outer covering for metal cans, said white film causing less wear of dies made of metal used to make metal cans.

BACKGROUND OF THE INVENTION

Metal cans, such as steel cans and aluminum cans, used as packaging containers for food and drinks, are being used in large quantities. To impart corrosion resistance and printability to these metal cans, solvent-based paints consisting mainly of thermosetting resins have been applied to can surfaces.

However, such application of paint lowers productivity and causes problems including environmental pollution. Therefore, in recent years, laminates have been used more frequently which are produced by laminating biaxially stretched plastic films or heat-sealable layers with such plastic film used as a substrate to provide a laminated film which is then laminated to a metal sheet and subjected to various forming and processing techniques for use as a metal can.

Metal cans covered with plastic films are produced by laminating a plastic film to a metal sheet (including those which are plated or otherwise surface-treated), such as a steel sheet or aluminum sheet, and subjecting it to forming process. Plastic films put to such use are required to have the following various properties at once:

(i) Being superior in laminatability with respect to metal sheets.
(ii) Being superior in can formability. That is, the film suffers no delamination, no cracking or no pinhole formation during the can forming process.
(iii) No possibility of destroying the flavor of the contents of the can (when the plastic film is used on the inner surface of the can).
(iv) Retort treatment should not be attended with occurrence of water spot or white powder. (By water spot is meant a phenomenon in which a film which has been melted and non-crystallized during laminating catches water drops during the retort treatment to become crystallized and whitened. When water spot occurs, this detracts from the aesthetic feature of the goods. By white powder is meant a form of a low molecular weight substance, such as oligomer, deposited on the film surface. When a laminated film is used on the inner surface of a can, the white powder detracts from the flavor of the can contents, while when it is used on the outer can surface, the aesthetic feature of the can is spoiled by the white powder.)

Usually, cans are externally printed, at which time white paint is applied as an undercoat for the purpose of hiding the metal color and then printing is applied thereon. In recent years, in view of simplification of manufacturing processes (energy reduction and cost reduction) and measures against environmental problems (non-use of solvent), production of cans having laminated thereto a white film in hidability has been in progress.

As such white film, use is made of a polyester resin mixed with a high concentration of titanium oxide. Such material, however, is insufficient in whiteness and hidability and it has been desired to increase the amount of titanium. Increase in the amount of titanium, however, presents problems including the stiffening of the film surface, the wearing of dies made of metal for producing cans, and the sticking of scraped metal or titanium oxide to the film surface which results in unevenness of printing during printing and in aggravation of laminatability with respect to steel sheets.

As for such white film for metal lamination, one is disclosed in Japanese Patent Laid Open No. 5-170942 which is produced by mixing titanium oxide to copolymer polyester in order to improve can formability. Further, another is disclosed in Japanese Patent Laid Open No. 5-339391 which is produced by mixing rutile-based titanium oxide of 95% or more purity to copolymerized polyester. Further, still another is disclosed in Japanese Patent Laid Open No. 6-271686 which is produced by mixing master chips of titanium oxide of high concentration and diluting polymer having a wide viscosity size distribution in order to improve can processability and shock resistance. Further, another is disclosed in Japanese Patent Laid Open No. 6-49234 which is produced by mixing a diluting polymer of high viscosity with master chips of titanium oxide in order to improve shock resistance. Further, a laminated polyester film produced by laminating two copolymerized polyesters different in pigment concentration is disclosed in Japanese Patent Laid Open Nos. 6-39980 and 7-52351.

Although single-layer or double-layer films having titanium oxide filled into polyester resin have been proposed as described above, none of them satisfy the two requirements at the same time; improved whiteness and reduced wear of can producing dies.

Further, in recent years, in addition to the desire of further improving the whiteness and hidability of films for cans, there has been a desire that the thickness of films be further reduced for cost reduction. To meet this desire, it is necessary to incorporate titanium oxide in a higher filling density.

However, incorporation of titanium oxide in a higher filling density involves various problems; (a) during production of films, particularly during stretching, breaks are liable to occur, detracting from operatability, (b) laminatability with respect to metal sheets is aggravated, (c) during the forming process of film-laminated metal sheets, dies made of metal or the like tend to be damaged, (d) it is difficult to print onto laminate film surfaces(defects are liable to occur).

DISCLOSURE OF THE INVENTION

An object of the invention is to provide a white film to be laminated to a metal surface and a method of producing the same, which white film is superior in heat adherability (heat laminatability) to metal sheets, formability into cans, hidability and whiteness and which causes no damage to dies during production of cans, these features producing the white film suitable for use as covering metal cans.

Using polyesters of particular chemical construction as raw materials to produce a film in three-layer construction having three layers of different materials, a first layer which is middle, and second layers, front and back, we have found that the above problems can be solved, that a film having higher whiteness and higher hidability can be obtained and that the operating efficiency in the production of said film can be greatly improved, by producing different the amounts of titanium oxide incorporated in said first and second layers, that is, localizing the amount of titanium oxide in the first layer; thus we have achieved the present invention.

More particularly, a white film to be laminated to a metal surface according to the present invention comprises first and second layers which are laminated with the arrangement of second layer/first layer/second layer, wherein the first layer is made of a composition composed of 80–40 wt % polyester which, in turn, is composed of 100–75 mol % ethylene terephthalate unit and 0–25 mol % ethylene isophthalate unit, these units adding up to 100 mol %, and 20–60 wt % titanium oxide mixed with said polyester so that the total adds up to 100 wt %, and the second layers, front and back, are made of a composition composed of 80–100 wt % polyester which, in turn, is composed of 94–70 mol % ethylene terephthalate unit, 5–25 mol % ethylene isophthalate unit and 1–5 mol % diethylene tere(iso)phthalate unit, these units adding up to 100 mol %, and 20–0 wt % titanium oxide mixed with said polyester so that the total adds up to 100 wt %, said film being a biaxially stretched film, the amount of titanium oxide contained in said film being 20–50 wt %.

A method of producing a white film to be laminated to a metal surface according to the invention is a method in which said white film comprises first and second layers which are laminated with the arrangement of second layer/first layer/second layer, wherein the first layer is made of a composition composed of 80–40 wt % polyester which, in turn, is composed of 100–75 mol % ethylene terephthalate unit and 0–25 mol % ethylene isophthalate unit, these units adding up to 100 mol %, and 20–60 wt % titanium oxide mixed with said polyester so that the total adds up to 100 wt %, and the second layers, front and back, are made of a composition composed of 80–100 wt % polyester which, in turn, is composed of 94–70 mol % ethylene terephthalate unit, 5–25 mol % ethylene isophthalate unit and 1–5 mol % diethylene tere(iso)phthalate unit, these units adding up to 100 mol %, and 20–0 wt % titanium oxide mixed with said polyester so that the total adds up to 100 wt %, said film being a biaxially stretched film, the amount of titanium oxide contained in said film being 20–50 wt %, said method comprising the steps of:

using such resins that the intrinsic viscosities of the polyesters in the first and second layers are 0.5 or more;

producing unstretched sheet by molten co-extrusion of these resins; and stretching the resulting unstretched sheet longitudinally and transversely.

Therefore, according to the invention, there are provided an inexpensive multi-layer white film for metal lamination and a method of producing the same, which white film has superior heat laminatability (heat adherability), formability and strength and which is superior in whiteness and hidability, so that it can be suitably used for covering metal cans.

The present invention will now be described in more detail.

A white film of the invention is a polyester film comprising an intermediate layer of high titanium oxide concentration (hereinafter referred to as the B-layer), and layers of low titanium oxide concentration disposed on the opposite sides of said intermediate layer (hereinafter referred to as the S-layers). The S-layers are made of a material containing 94–70 mol % ethylene terephthalate unit, 5–25 mol % ethylene isophthalate unit and 1–5 mol % diethylene tere (iso)phthalate unit, these units adding up to 100 mol %. The B-layer is made of a material containing 100–75 mol % ethylene terephthalate unit and 0–25 mol % ethylene isophthalate unit, these units adding up to 100 mol %.

The proportion of the ethylene isophthalate in the S-layers is 5–25 mol % as described above, but preferably 8–15 mol %. If it is less than 5 mol %, this would detract from heat laminatability between the film and metal, e.g., a steel sheet, and processability from a film-laminated steel sheet to cans. If it is greater than 25 mol %, this would offer problems concerning heat resistance during heat setting and based finishing subsequent to the production of cans; the material would lose crystallizability, it would become difficult to sufficiently dry resin pellets, troubles occur concerning the film production, the film would become non-crystallizable, causing in the lack of film strength and heat resistance, and in the film-laminated metal sheet getting caught around the hot roll during the can producing process.

The proportion of the diethylene tere(iso)phthalate unit in the S-layers is 1–5 mol % as described above, but preferably 2–4 mol %. The introduction of diethylene tere(iso)phthalate unit within this range of proportion as a polyester component makes it possible to adjust the balance between the non-crystallizability-imparting effect provided by the ethylene isophthalate unit and the crystallizability of the ethylene terephthalate unit, thereby providing heat laminatability between the film and metal, processability into cans, heat resistance and strength.

Further, it is preferable in view of strength, heat resistance and heat laminatability that the sum of the ethylene terephthalate unit and the diethylene tere(iso)phthalate unit in the S-layers be within the range of 6–25 mol %. If it is less than 6 mol %, this would detract from heat laminatability between a polyester film and metal, and processability from film-laminated steel sheets to cans. If it exceeds 25 mol %, this would result in the loss of crystallizability, making it difficult to sufficiently dry pellets. Further, the film strength and heat resistance would be insufficient, or the film would be non-crystallizable, causing the film-laminated metal sheet to be wound around the hot roll during the can producing process.

The proportion of the ethylene isophthalate unit in the B-layer is 0–25 mol % as described above, but preferably 5–15 mol %. If it exceeds 25 mol %, this would result in the material losing its crystallizability, producing it difficult to sufficiently dry pellets. Further, the film would be non-crystallizable, resulting in lacking strength and heat resistance or the film-laminated metal sheet tending to be wound around the hot roll during the can producing process.

It is possible to control the balance of crystallizability of the film by copolymerizing the polyester in the B-layer with less than 5 mol %, preferably 1–4 mol %, diethylene tere(iso)phthalate unit.

The polyesters used in the present invention may be single polyesters or two or more polyesters melted and mixed.

The polyester materials for the S- and B-layers should have an intrinsic viscosity of 0.5 or more, preferably 0.6–1.2. The use of a polyester whose intrinsic viscosity is less than 0.5 would detract from operatablility during film production, and the resulting film would be lacking in strength. However, excessively high intrinsic viscosity is not desirable since it excessively increases the production cost.

It is desirable that the difference in the intrinsic viscosity between the polyesters in the S- and B-layers be 0.1 or less, preferably 0.09 or less. If the difference in intrinsic viscosity exceeds 0.1, this would result in a flow mark formed in the film during the film producing process. By the flow mark is meant a kind of resin flow variation, i.e., a flow pattern of resins, which takes place when two or more resins of different viscosities which are flowing meet together in a feed block or a T-die.

The polyesters used in the present invention are preferably those having a melting point of 200–240° C. when they are crystalline or having a glass transition temperature of 50–85° C. when they are non-crystalline. Deviation from these ranges would result in insufficient heat resistance or decreased heat laminatability.

The polyesters constituting the S- and B-layers may be optionally combined within the range which satisfies said conditions. Included among the possible combinations is a particularly preferable one in which the polyester in the S-layers has a melting point (or a glass transition temperature when it is non-crystalline) which is equal to or lower than that of the polyester in the B-layer. This makes it possible to provide a good balance among the strength, heat resistance and laminatability of the film.

The polyesters used in the present invention may have components, other than isophthalic acid and diethylene glycol, copolymerized within the range which does not spoil the characteristics. Examples of such copolymer components are dicarboxylic acids, such as phthalic acid, 2,6-naphthalene dicarboxylic acid, 5-sodium sulfoisophthalic acid, oxalic acid, succinic acid, adipic acid, sebacic acid, azelaic acid, dodecanoic acid, dimer acid, maleic acid anhydride, maleic acid, fumaric acid, itaconic acid, citraconic acid, mesaconic acid, and cyclohexanedicarboxylic acid. Other examples are 4-hydroxybenzoic acid and oxycarboxylic acids such as ε-caprolactone and lactic acid. Still other examples are glycols, such as 1,3-propanediol, 1,4-butanediol, neopentyl glycol, 1, 6-hexanediol, cyclohexanedimethanol, triethylene glycol, polyethylene glycol, polypropylene glycol, polytetramethylene glycol, and ethylene oxide adducts of bisphenol A and bisphenol S. Further, a little use may be made of compounds having 3 functional groups, such as trimellitic acid, trimesic acid, pyromellitic acid, trimethylolpropane, glycerine, and pentaerythritol.

The amount of titanium oxide in the films of the present invention, expressed in terms of the average concentration in the film, is 20–50 wt %, preferably 25–45 wt %, most suitably 25–40 wt %. If this content is less than 20 wt %, the resulting film would lack whiteness and hidability. If it exceeds 50 wt %, the resulting film, even having a particular three-layer construction as in the present invention, would be decreased in strength and inferior in formability after lamination.

The amount of titanium oxide in the B-layer is 20–60 wt %, preferably 25–55 wt %, most suitably 30–50 wt %. If this content is less than 20 wt %, the resulting film would lack whiteness and hidability. If it exceeds 60 wt %, the resulting film would be decreased in strength and inferior in formability after lamination.

The amount of titanium oxide in the S-layers, under the condition that it includes 0 wt %, is not more than 20 wt %, preferably not more than 15 wt %, most suitably 10 wt %. If this content exceeds 20 wt %, this sometimes results in the dies wearing during lamination to metal sheets or during the production of cans of the film-laminated metal sheets, exerting a considerable adverse influence on the manufacturing process, or causing particles from the abraded metal or titanium oxide to adhere to the film surface during the can producing process, thus offering problems concerning printability.

A known single-layer white film having a titanium oxide content of about 20 wt % has insufficient whiteness and hidability. As a countermeasure, if the titanium content is increased in order to increase whiteness and hidability, this offers the problem of causing the can producing dies to wear, the problem of particles of the abraded metal or titanium adhering to the film surface to produce unevenness of printing during printing, and the problem of aggravating heat laminatability with respect to steel sheets.

In contrast, the film of the present invention is capable of solving such various problems by decreasing the concentration of the titanium oxide in the S-layers which are the outer layers and increasing the concentration of the titanium oxide in the B-layer which is the inner layer.

According to the present invention, the above various problems can be solved more effectively by setting the ratio Cb/Cs of the concentration Cb (wt %) of the titanium oxide mixed in the B-layer to the concentration Cs (wt %) of the titanium oxide mixed in the S-layer to 3 or more, preferably 5 or more.

Let Ts be the thickness of the S-layer (in μm) and Tb be the thickness of the B-layer (in μm). If the relation between the titanium oxide concentrations in the S- and B-layers and the thickness of each layer satisfies the relation, $$3 \leq (Cb/Cs) \times [Tb/(Tb+Ts)]$$

it is possible to improve the whiteness and hidability while retaining the mechanical characteristics and formability of the film. That is, increasing the titanium oxide concentration Tb of the B-layer which is the inner film relative to the titanium concentration of the S-layers which are the outer layers makes it possible to decrease the thickness Tb of the inner layer film while retaining the hidability and whiteness. If the value of the right-hand side of the above formula is less than 3, it is necessary to increase the overall thickness of the film before the whiteness and hidability of the film can be improved. This is liable not only to decrease formability but also to lose the economics.

Titanium oxide may be used subsequent to any known surface treatment according to need. Further, titanium oxide may be processed as by a mixer to provide a master batch containing 50–70 wt % titanium oxide or it may added directly during the film producing process.

It is preferable that titanium oxide have an average particle size of 0.1–0.5 μm, preferably 0.2–0.5μm. if it is greater than 0.5μm, the overall surface area per unit weight of titanium oxide would be decreased, sometimes resulting in the lack of hidability and whiteness of the film. Further, the resulting film surface would be uneven and lose luster, being disqualified for printing. If it is less than 0.1 μm, the average particle size would be smaller than the wavelength of visible rays to allow the latter rays to pass through the film. Also the film would lack hidability and whiteness.

It is preferable that the films of the present invention satisfy the following characteristics (1)–(4).
(1) The tensile strength is not less than 10 kgf/mm$^2$, preferably 13 kgf/mm$^2$.
(2) The longitudinal (MD) and transverse (TD) heat shrinkage factors of the film at 150° C., 30 minutes are not more than 6.0%, preferably 0.5–5.0%.
(3) The optical density is not less than 0.3, preferably 0.4–0.7.
(4) The whiteness is not less than 81.0, preferably 85.0.

If the tensile strength is less than 10 kgf/mm$^2$, the working strength would be insufficient. If the heat shrinkage factor is not less than 6%, the adhesion to steel sheets would be degraded. If the optical density is less than 0.3, the hidability would be insufficient. If the whiteness is less than 81.0, the whiteness would be insufficient in practice.

If the lower limits of these characteristic values are defined, the greater the values, the better, while if their upper limits are defined, the smaller the values, the better. However, excessively high quality increases cost and moreover detracts from the operability during the film producing process; thus, the above-mentioned ranges are suitable.

The thickness of the B-layer is 5–20 µm, preferably 10–15 µm, while the thickness of each S-layer is 0.5–5 µm, preferably 1–3 µm, the overall thickness being preferably 6–30 µm. If the thickness of the B-layer is less than 0.5 µm, this would results in the film whiteness and hidability being insufficient, and if it exceeds 20 µm, this means excessively high quality, losing cost performance. Further, if the thickness of the S-layer is less than 0.5 µm, this would result in the dies being worn during the can producing process or in detracting from the printability. On the other hand, if it exceeds 5 µm, the mechanical property of the films would be improved but the whiteness and hidability would not be so high for the film thickness and delamination would be likely to occur at the interface between the S- and B-layers during the can producing process. The overall film thickness is preferably 9–25 µm, more preferably 12–17 µm, in order to secure formability for drawing and ironing operations.

The heat shrinkage factor of the films of the invention at 150° C., 30 minutes is preferably such that $$TD \leq 6\%, MD-TD \geq 3\%$$

and more preferably such that $$TD \leq 5\%, MD-TD \geq 3.5\%$$

since prevents wrinkling during heat lamination to steel sheets.

Polyesters for forming films according to the invention can be produced in the usual manner. For example, polyethylene terephthalate type copolymers in which isophthalic acid component and diethylene glycol are copolymerized are produced as follows.

First, a slurry of terephthalic acid and ethylene glycol is continuously fed into an esterification tank containing bis (β-hydroxyethyl) terephthalate and/or a low polymer thereof, and they are allowed to react with each other at 250° C. for about 8 hours, thus continuously producing an ester with an esterification percentage of about 95. This product is then carried into a polymerization tank, where a required amount of isophthalic acid or ethylene glycol ester thereof and diethylene glycol are added thereto. And under the presence of a catalyst, such as antimony trioxide or germanium dioxide, polycondensation is effected under reduced pressure of not more than 1.3 hPa at about 280° C.

The film of the invention can be produced by the following methods.

Unstretched sheets are produced by a method which uses separate extruders so that two resin compositions constituting the individual layers, after being melted and superposed one upon the other by the feed block process, are extruded through a die, a method which comprises the step by placing two resin compositions which constitute the individual layers on each other in a multimanifold die and extruding them or by a combination of these two methods. Then, such unstretched sheet is longitudinally and transversely stretched using the tenter biaxial stretching process or inflation process, whereby the film of the invention is obtained.

Alternatively, it is possible to use a method in which two types of stretched films constituting the individual layers are doubled.

When the tenter biaxial stretching process is used, two types of polyester compositions having titanium oxide mixed therein which constitute the S- and B-layers are fed into a melt extruder, from which they are extruded at a temperature of 220–280° C. into a sheet form, the extruded sheet being contacted for cooling on a cooling drum held at a controlled temperature below the room temperature, the unstretched sheet being then preliminarily stretched to about 1–1.2 times in the MD according to need, whereafter by a tenter it is biaxially stretched at a temperature of 50–150° C. to with a stretch magnifying factor of 2–4 times in both the MD and the TD. Further, it is subjected to a heat treatment at 80–220° C. for some seconds to provide some slack percentage in the TD, thereby producing the film of the invention.

The biaxial stretching processes using a tenter include the simultaneous biaxial stretching process and the sequential biaxial stretching process. When a larger proportion of titanium oxide is incorporated, the film will tend to break more easily during stretching; however, use of the simultaneous stretching process reduces the occurrence of such breaks to a great measure. Thus, the simultaneous stretching process is more suitable.

The heat treatment followed by the stretching is a process required to reduce the heat shrinkage factor of the film. Known heat treating methods may be used, such as one which blows heated air, another which radiates infrared rays, and another which radiates microwaves. Of these methods, the one which blows heated air is most suitable because of its capability of uniformly and accurately heating the film.

In order to facilitate passage from process to process such as passage to the film producing process or to the can producing process, it is desirable to add a small amount of inorganic lubricant, such as silica, alumina or kaolin, to form a film to impart slippability to the film surface. Further, in order to improve the external appearance and printability of the film, it is also possible for the film to contain a silicone compound or the like.

Further, in order to improve laminatability to metal or to increase the strength, any coating layer, such as an adhesive layer, may be formed by inline coating during the film production or by post-coating after the film production.

In cases where the metal sheet to be laminated with the film of the invention is a steel sheet, it is preferable to use a steel sheet which has been subjected to a chemical treatment, such as chromic acid treatment, phosphoric acid treatment, electrolytic chromium treatment, or chromate treatment or a steel sheet which has been plated with nickel, tin, zinc, aluminum, gun metal, brass or the like.

The invention will now be described in the concrete with reference to examples thereof.

In the following examples and comparative examples, the characteristic value of the film were measured as follows.

A. Intrinsic Viscosity

Using a phenol/tetrachloroethane equiweight mixture solution, it was measured from its solution viscosity at 20° C.

B. Tensile Strength

According to the measuring method specified in ASTM D882, it was measured using 10-mm wide, 10-cm long samples (n=5 piece). In addition, the data are shown with average values for MD and TD.

C. Heat Shrinkage Factor

A 10-mm wide, 10-cm long sample was left to stand in an atmosphere at 150° C. under a load of about 0.4 g for 30 minutes, and changes in size which were present before and after the time it was left to stand was measured. And the heat shrinkage factor was calculated in terms of the percentage of the length after standing to the original length. In addition, the data are shown with average values of three pieces for the MD direction and of three pieces for the TD direction and with average values of MD and TD.

D. Optical Density

Macbeth's Transmission Concentration Meter TD 932 was used and with the transmission nozzle diameter adjusted to 3 mm, the amount of incident light I and the amount of transmitted light I were measured and the transmission concentration D was calculated by the following formula, the result being taken as the optical density.

$$D = -\log(I/I).$$

E. Whiteness

It was measured by JIS L 1015 7.11 C Method for white color degree (Hunter's method).

F. Bonding Strength (Heat Laminatability)

A sample film and a 0.21-mm thick tin-free steel sheet, in a superposed state, were fed between a metal roll heated to 240° C. and a silicone rubber roll and thermally bonded together at a feed rate of 20 m/min and a line pressure of 50 kgf/cm. It was cooled with water and then, in the form of a 25-mm wide test piece, was tested for 180 degrees release strength under the condition of the release rate being 10 mm/min using Shimazu Corporation's Autograph. And if the release strength or film break strength was 300 gf or more, the product was decided to be acceptable (hereinafter indicated by the mark "O"), while if the release strength or film break strength was less than 300 gf, the product was decided to be unacceptable (hereinafter indicated by the mark "X").

G. Film Thickness

Thin sections were cut from a stretched film using a microtome and their respective thicknesses were measured using an electron microscope.

H. Wearability of Can Producing Dies

It was evaluated by how scratches were produced during the can producing process. More particularly, a film was superposed on a tin-free steel and subjected to deep drawing for a 350-milliliter two-piece can with the film side used as the outer surface of the can. This operation was performed until 100 cans were produced, during which operation the dies used in deep drawing were examined for scratches. If no scratches were observed, the product was decided to be acceptable (hereinafter indicated by the mark "O"), while if any scratch, however small, was observed, the product was decided to be unacceptable (hereinafter indicated by the mark "X").

I. Composition of Polyester

It was found by performing $^1$H-NMR analysis at 300 MHZ using a Varian's analyzer. The content of the ethylene terephthalate unit was calculated on the basis of the proportion of the terephthalic acid in the total amount of acid component; the content of the ethylene isophthalate unit is calculated on the basis of the proportion of the isophthalic acid in the total amount of acid component; and the content of the diethylene tere(iso)phthalate unit is calculated on the basis of the proportion of the diethylene glycol in the total amount of glycol.

EXAMPLES 1–14 AND COMPARATIVE EXAMPLES 1–7

The polyester resin composition which constituted the S-layer shown in each of Tables 1 and 2 was molten-extruded at 280° C. through a first extruder. Similarly, the polyester resin composition which constituted the B-layer was molten-extruded at 280° C. through a second extruder.

The two types of molten resins were superposed in a multimanifold die to form three-layer structures S/B/S having layer thicknesses shown in Tables 1 and 2, said three-layer structures being then extruded into sheet form through a T-die, the resulting sheets being cooled by being contacted with a cooling drum at a surface temperature of 18° C.; thus, 70–300-μm thick unstretched sheets were obtained.

The thus-obtained unstretched sheets were fed into a tenter type simultaneous biaxial stretching machine, whereby they were simultaneously biaxially stretched at 90° C. with a stretch magnifying factor of 3.0 for MD and 3.3 for TD. Thereafter, with a relaxation factor of 5% for TD, a heat treatment was performed at a temperature of 155° C. for 4 seconds. And they were cooled and wound, whereby white multi-layer films having a thickness of 7–30 μm were obtained.

Characteristic values of the obtained films are shown in Tables 1 and 2.

TABLE 1

| | S-LAYER | | | | | B-LAYER | | | | | | |
|---|---|---|---|---|---|---|---|---|---|---|---|---|
| | COMPOSITION | | | | LAYER | COMPOSITION | | | | LAYER | | |
| | INTRINSIC VISCOSITY dl/g | IPA PROPOR- TION mol % | DEG PROPOR- TION mol % | TITANIUM CONTENT Cs wt % | THICK- NESS Ts μm | INTRINSIC VISCOSITY dl/g | IPA PROPOR- TION mol % | DEG PROPOR- TION mol % | TITANIUM CONTENT Cb wt % | THICK- NESS Tb μm | Cb/ Cs | (Cb/Cs) × (Tb/(Tb + Ts)] |
| Example | | | | | | | | | | | | |
| 1 | 0.70 | 10 | 25 | 5 | 1 | 0.65 | 10 | 2.5 | 35 | 13 | 7 | 6.0 |
| 2 | 0.70 | 6 | 2.5 | 5 | 1 | 0.65 | 10 | 2.5 | 35 | 13 | 7 | 6.0 |
| 3 | 0.70 | 24 | 2.5 | 5 | 1 | 0.65 | 10 | 2.5 | 35 | 13 | 7 | 6.0 |
| 4 | 0.70 | 10 | 2.5 | 5 | 1 | 0.65 | 0 | 2.5 | 35 | 13 | 7 | 6.0 |
| 5 | 0.70 | 10 | 2.5 | 5 | 1 | 0.65 | 2.5 | 45 | 7 | 9 | 7.0 | |
| 6 | 0.70 | 10 | 2.5 | 1 | 1 | 0.65 | 10 | 2.5 | 57 | 13 | 57 | 49 |
| 7 | 0.70 | 10 | 2.5 | 1 | 2 | 0.65 | 10 | 2.5 | 57 | 7 | 57 | 36 |
| 8 | 0.70 | 10 | 2.5 | 9 | 1 | 0.65 | 2.5 | 35 | 13 | 4 | 3.5 | |
| 9 | 0.70 | 10 | 2.5 | 3 | 1 | 0.65 | 10 | 2.5 | 35 | 13 | 11 | 9.5 |
| 10 | 0.70 | 10 | 2.5 | 3.5 | 1 | 0.65 | 10 | 2.5 | 35 | 5 | 10 | 7.1 |
| 11 | 0.70 | 10 | 2.5 | 7 | 5 | 0.65 | 10 | 2.5 | 35 | 20 | 5 | 3.3 |

TABLE 1-continued

| | S-LAYER | | | | B-LAYER | | | | | | |
|---|---|---|---|---|---|---|---|---|---|---|---|
| | COMPOSITION | | | LAYER | COMPOSITION | | | LAYER | | | |
| | INTRINSIC VISCOSITY dl/g | IPA PROPORTION mol % | DEG PROPORTION mol % | TITANIUM CONTENT Cs wt % | THICKNESS Ts μm | INTRINSIC VISCOSITY dl/g | IPA PROPORTION mol % | DEG PROPORTION mol % | TITANIUM CONTENT Cs wt % | THICKNESS Ts μm | Cb/Cs | (Cb/Cs) × (Tb/(Tb + Ts)] |
| 12 | 0.66 | 16 | 2.5 | 5 | 1 | 0.60 | 2.5 | 30 | 13 | 6 | 5.2 | |
| 13 | 0.66 | 16 | 2.5 | 5 | 1 | 0.58 | 10 | 2.5 | 30 | 13 | 6 | 5.2 |
| 14 | 0.70 | 10 | 2.5 | 5 | 1 | 0.65 | 10 | 0 | 35 | 13 | 7 | 6.0 |

TABLE 1

| FILM PERFORMANCE | | | | | | | | |
|---|---|---|---|---|---|---|---|---|
| TITANIUM CONTENT wt % | TENSILE STRENGTH kgf/mm$^2$ | HEAT SHRINKAGE FACTOR % AVERAGE | MD | TD | OPTICAL DENSITY | WHITENESS | SCRATCHES OCCURRING DURING CAN PRODUCING PROCESS | HEAT LAMINATABILITY | |
| 31 | 14.2 | 3.0 | 5.1 | 1.0 | 0.55 | 86.9 | ○ | ○ | 1 |
| 31 | 14.3 | 3.1 | 4.9 | 1.3 | 0.56 | 87.0 | ○ | ○ | 2 |
| 31 | 12.9 | 2.9 | 5.3 | 0.5 | 0.54 | 86.8 | ○ | ○ | 3 |
| 31 | 14.5 | 3.2 | 4.9 | 1.5 | 0.57 | 87.1 | ○ | ○ | 4 |
| 36 | 11.5 | 3.2 | 5.8 | 0.6 | 0.54 | 86.4 | ○ | ○ | 5 |
| 50 | 10.9 | 2.5 | 4.4 | 0.4 | 0.68 | 94.1 | ○ | ○ | 6 |
| 37 | 11.0 | 4.0 | 6.3 | 1.8 | 0.67 | 93.0 | ○ | ○ | 7 |
| 32 | 14.5 | 3.8 | 5.8 | 1.9 | 0.45 | 84.5 | ○ | ○ | 8 |
| 30 | 14.6 | 3.1 | 5.1 | 1.0 | 0.49 | 85.1 | ○ | ○ | 9 |
| 26.0 | 15.7 | 4.0 | 6.2 | 1.8 | 0.47 | 83.1 | ○ | ○ | 10 |
| 24.5 | 15.3 | 2.3 | 4.4 | 0.2 | 0.55 | 86.8 | ○ | ○ | 11 |
| 27 | 14.9 | 3.4 | 5.5 | 1.3 | 0.49 | 84.2 | ○ | ○ | 12 |
| 27 | 13.5 | 2.4 | 4.8 | 0.6 | 0.45 | 84.1 | ○ | ○ | 13 |
| 31 | 14.4 | 2.9 | 4.9 | 1.0 | 0.55 | 86.7 | ○ | ○ | 14 |

TABLE 2

| | S-LAYER | | | | | B-LAYER | | | | | | |
|---|---|---|---|---|---|---|---|---|---|---|---|---|
| | COMPOSITION | | | | LAYER | COMPOSITION | | | | LAYER | | |
| | INTRINSIC VISCOSITY dl/g | IPA PROPORTION mol % | DEG PROPORTION mol % | TITANIUM CONTENT Cs wt % | THICKNESS Ts μm | INTRINSIC VISCOSITY dl/g | IPA PROPORTION mol % | DEG PROPORTION mol % | TITANIUM CONTENT Cs wt % | THICKNESS Ts μm | Cb/Cs | (Cb/Cs) × (Tb/(Tb + Ts)] |
| COMPARATIVE EXAMPLE | | | | | | | | | | | | |
| 1 | 0.70 | 4 | 2.5 | 5 | 1 | 0.65 | 10 | 2.5 | 35 | 13 | 7 | 6.0 |
| 2 | 0.70 | 27 | 2.5 | 5 | 1 | 0.65 | 10 | 2.5 | 35 | 13 | 7 | 6.0 |
| 3 | 0.70 | 10 | 2.5 | 5 | 1 | 0.65 | 27 | 2.5 | 35 | 13 | 7 | 6.0 |
| 4 | 0.70 | 20 | 7.5 | 5 | 1 | 0.65 | 10 | 2.5 | 35 | 13 | 7 | 6.0 |
| 5 | 0.70 | 10 | 2.5 | 5 | 1 | 0.65 | 10 | 2.5 | 65 | 13 | 1 | 11 |
| 6 | 0.70 | 10 | 2.5 | 5 | 1 | 0.65 | 10 | 2.5 | 16 | 13 | 3 | 2.8 |
| 7 | 0.70 | 10 | 2.5 | 25 | 1 | 0.65 | 10 | 2.5 | 25 | 13 | 1 | 1.2 |

In Tables 1 and 2, "IPA" represents isophthalic acid and "DEG" represents diethylene glycol.

As is clear from Table 1, Examples 1–14 are each superior in whiteness, hidability and heat laminatability to steel sheets and they were not observed to make scratches on the dies during the can producing process.

In contrast, Comparative Example 1 was inferior in heat laminatability since the content of the ethylene isophthalate unit in the S-layer was excessively as low as 4 mol %. Comparative Example 2 was low in film strength and inferior in heat laminatability since the content of the ethylene isophthalate unit in the S-layers was excessively as high as 27 mol %. Comparative Example 3 was low in film strength and inferior in heat laminatability since the content of the ethylene isophthalate unit in the B-layer was excessively as high as 27 mol %. Comparative Example 4 was low in film strength and inferior in heat laminatability since the content of the diethylene tele(iso)phthalate unit in the S-layer was excessively as high as 7.5 mol %. Comparative Example 5 was low in film strength since the content of titanium oxide in the B-layer was excessively as large as 65 wt %. In Comparative Example 6, the content of titanium oxide in the B-layer was excessively as low as 16 wt %, and the content of titanium oxide in the film was also excessively as low as 15 wt %, so that the whiteness of the film was insufficient. In Comparative Example 7, since the content of titanium oxide in the S-layers was excessively as large as 25 wt %, scratches were observed on the dies during the can producing process.

What is claimed is:

1. A white film to be laminated to a metal surface, comprising first and second layers which are laminated in the arrangement of second layer/first layer/second layer, wherein
    the first layer is made of a composition composed of 80–40 wt % polyester which, in turn, is composed of 100–75 mol % ethylene terephthalate unit and 0–25 mol % ethylene isophthalate unit, these units adding up to 100 mol %, and 20–60 wt % titanium oxide mixed with said polyester so that the total adds up to 100 wt %,
    the second front and back layers are made of a composition composed of not less than 80–100 wt % polyester which, in turn, is composed of 94–70 mol % ethylene terephthalate unit, 5–25 mol % ethylene isophthalate unit and 1–5 mol % diethylene tere(iso)phthalate unit, these units adding up to 100 mol %, and less than 20 wt % titanium oxide mixed with said polyester so that the total adds up to 100 wt %,
    said film being a biaxially stretched film,
    the amount of titanium oxide contained in said film being 20–50 wt % ; and
    said titanium oxide particles having a diameter of 0.1–0.5 $\mu$m.

2. A white film as set forth in claim 1, wherein the ratio Cb/Cs between the content Cb, in percentage by weight, of titanium oxide in the first layer and the content Cs, in percentage by weight, of titanium oxide in the second layers is such that $3 \leq Cb/Cs$.

3. A white film as set forth in claim 1, wherein the ratio Cb/Cs between the content Cb, in percentage by weight, of titanium oxide in the first layer and the content Cs, in percentage by weight, of titanium oxide in the second layers is such that $5 \leq Cb/Cs$.

4. A white film as set forth in claim 1, wherein the content Cb, in percentage weight, of titanium oxide in the first layer, the thickness Tb ($\mu$m) of the first layer, the content Cs, in percentage by weight, of titanium oxide in the second layers, the thickness Ts ($\mu$m) of each of the second layers satisfy the relation expressed by $$3 \leq (Cb/Cs) \times [Tb/(Tb+Ts)].$$

5. A white film as set forth in claim 1, wherein the thickness of the first layer is 5–20 $\mu$m and the thickness of each of the second layers is 0.5–5 $\mu$m, the total thickness of the film being 6–30 $\mu$m.

6. A white film as set forth in claim 1, wherein the tensile strength is not less than 10 kgf/mm$^2$, the optical density is not less than 0.3 wherein the optical density is the log of the ratio of incident light to the amount of transmitted light, and the whiteness is not less than 81.0.

7. A white film as set forth in claim 1, wherein the heat shrinkage factors for an atmosphere at 150° C. under a load of about 0.4 g for 30 minutes are such that transverse heat shrinkage factor $\leq 6\%$, and (heat shrinkage factor in the machine direction)–(heat shrinkage factor in the transverse direction) $\geq 3\%$.

8. A white film as set forth in claim 1, wherein the film is obtained by a process comprising the steps of:
    using such resins that the intrinsic viscosities of the polyesters in the first and second layers are 0.5 or more;
    producing an unstretched sheet by molten co-extrusion of these resins; and
    stretching the resulting unstretched sheet longitudinally and transversely.

9. A white film as set forth in claim 8, wherein the unstretched sheet is stretched longitudinally and transversely by means of a simultaneous biaxial stretching process.

10. A method of producing a white film to be laminated to a metal surface, said white film comprising first and second layers which are laminated with the arrangement of second layer/first layer/second layer, wherein
    the first layer is made of a composition composed of 80–40 wt % polyester which, in turn, is composed of 100–75 mol % ethylene terephthalate unit, 0–25 mol % ethylene isophthalate unit, these units adding up to 100 mol %, and 20–60 wt % titanium mixed with said polyester so that the total adds up to 100 wt %, and
    the second layers, front and back, are made of a composition composed of 80–100 wt % polyester which, in turn, is composed of 94–70 mol % ethylene terephthalate unit, 5–25 mol % ethylene isophthalate unit and 1–5 mol % diethylene tere(iso)phthalate unit, these units adding up to 100 mol %, and less than 20 wt % titanium oxide mixed with said polyester so that the total adds up to 100 wt %,
    said film being a biaxially stretched film,
    the amount of titanium oxide contained in said film being 20–50 wt % said titanium oxide particles having a diameter of 0.1–0.5 $\mu$m,
    said method comprising the steps of:
    using such resins that the intrinsic viscosities of the polyesters in the first and second layers are 0.5 or more;
    producing an unstretched sheet by molten co-extrusion of these resins; and
    stretching the resulting unstretched sheet longitudinally and transversely.

11. A method as set forth in claim 10, wherein the unstretched sheet is stretched longitudinally and transversely by means of a simultaneous biaxial stretching process.

* * * * *